United States Patent
Ke et al.

(10) Patent No.: US 12,554,012 B2
(45) Date of Patent: Feb. 17, 2026

(54) VEHICLE RADAR SYSTEM AND METHOD FOR DETECTING TARGET OBJECT

(71) Applicant: Alpha Networks Inc., Hsinchu (TW)

(72) Inventors: Tzu-Chung Ke, Hsinchu (TW); Yan-Ciao Jao, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 342 days.

(21) Appl. No.: 18/315,676

(22) Filed: May 11, 2023

(65) Prior Publication Data
US 2024/0061103 A1    Feb. 22, 2024

(30) Foreign Application Priority Data
Aug. 19, 2022  (TW) .................................. 111131274

(51) Int. Cl.
| | | |
|---|---|---|
| *G01S 13/931* | (2020.01) | |
| *G01S 7/03* | (2006.01) | |
| *G01S 7/35* | (2006.01) | |

(52) U.S. Cl.
CPC .............. *G01S 13/931* (2013.01); *G01S 7/03* (2013.01); *G01S 7/356* (2021.05)

(58) Field of Classification Search
CPC .......... G01S 13/931; G01S 7/356; G01S 7/03; G01S 13/343; G01S 13/42; G01S 13/584; G01S 7/35; G01S 7/352; G01S 13/4454
See application file for complete search history.

(56) References Cited

U.S. PATENT DOCUMENTS

| | | | | |
|---|---|---|---|---|
| 7,525,478 B2 * | 4/2009 | Takano | ..................... | G01S 3/74 342/70 |
| 2015/0355313 A1 * | 12/2015 | Li | ........................... | G01S 13/66 342/195 |

(Continued)

FOREIGN PATENT DOCUMENTS

| | | |
|---|---|---|
| CN | 112824931 A | 5/2021 |
| TW | 202204929 A | 2/2022 |

OTHER PUBLICATIONS

Kim, S., Kim, B. and Lee, J., 2020. Low-Complexity-Based RD-MUSIC with Extrapolation for Joint TOA and DOA at Automotive FMCW Radar Systems. Journal of Sensors, 2020(1), p. 7342385. (Year: 2020).*

(Continued)

*Primary Examiner* — Bernarr E Gregory
*Assistant Examiner* — Yonghong Li
(74) *Attorney, Agent, or Firm* — Blank Rome LLP

(57) ABSTRACT

A vehicle radar system includes an antenna module, an RF module, and a signal processor. The antenna module includes at least one transmitting antenna and multiple receiving antennas. The RF module includes a transmitting segment that generates and transmits transmitting waves each carrying a transmitting signal, and a receiving segment that receives reflected waves and incorporates received signal carried by the reflected waves with the transmitting signal into a beat signal. The signal processor performs 2D-FFT on the beat signals to obtain estimated position information of the target object, determines whether a distance value of the estimated position information is greater than a preset distance threshold, and when it is determined that the distance value is greater than the preset distance threshold, perform two-dimensional Multiple Signal Classification (2D-MUSIC) on the estimated position informa- (Continued)

tion, so as to obtain an exact distance value and an exact angle value of the target object.

4 Claims, 5 Drawing Sheets

(56) References Cited

U.S. PATENT DOCUMENTS

2021/0215816 A1* 7/2021 Xu .................... G01S 13/32
2022/0236399 A1* 7/2022 Subburaj ............ G01S 13/42
2022/0242443 A1* 8/2022 Traa .................. G01S 13/343

OTHER PUBLICATIONS

Search Report appended to an Office Action, which was issued to Taiwanese counterpart application No. 111131274 by the TIPO on Mar. 20, 2023, with an English translation thereof.

* cited by examiner

VEHICLE RADAR SYSTEM AND METHOD FOR DETECTING TARGET OBJECT

CROSS-REFERENCE TO RELATED APPLICATION

This application claims priority to Taiwanese Invention Patent Application No. 111131274, filed on Aug. 19, 2022.

FIELD

The disclosure relates to a vehicle radar system and a method for detecting a target object, and more particularly to a vehicle radar system and a method that performs higher accuracy algorithms for detecting a distant object.

BACKGROUND

Radar systems have been widely used in vehicles for many years. A radar system installed in a vehicle (referred to as "vehicle radar system" hereinafter) can detect surrounding objects and provide detection results to a central processing unit of the vehicle.

Typically, a conventional vehicle radar system includes an antenna, a radio frequency (RF) module and a digital signal processor. The RF module emits millimetric waves via the antenna, and receives reflected waves from the surrounding objects. The digital signal processor calculates, with respect to each of the surrounding objects, a distance value and an angle value between the surrounding object and the antenna based on the reflected wave received from the surrounding object. The digital signal processor provides the distance values and the angle values thus calculated to the central processing unit of the vehicle for making decisions (e.g., related to an advanced driver-assistance system) or for self-driving.

The digital signal processor generally uses a fast Fourier transform (FFT) algorithm to calculate the distance values and the angle values. Since the central processing unit of the vehicle is supposed to respond to the surrounding objects in real time, calculations of the distance values and the angle values should be done swiftly and accurately. Currently, conventional vehicle radar systems commonly employ 2T4R type antenna modules each including two antennas for transmitting signals and four antennas for receiving signals. Each of the 2T4R type antenna modules can virtualize a 1T8R antenna array (hereinafter called eight virtual antennas). For a conventional vehicle radar system equipped with the 2T4R antenna module, an angular resolution of the conventional vehicle radar system computed by the digital signal processor using FFT algorithm is 14.32°. Given that the width of a lane is about 2.8 meters, the conventional vehicle radar system mounted in front of the vehicle can only detect objects within a distance of about 10 meters (see FIG. 1). That is to say, the conventional vehicle radar system cannot accurately detect an object that is more than 10 meters away from the vehicle.

Since the angular resolution of the conventional vehicle radar system is positively correlated to the number of virtual antennas, the more the virtual antennas there are, the higher the angular resolution will be. To achieve a more accurate result, higher performance hardware should be adopted, for example, by upgrading the aforementioned 2T4R antenna module to a 4T8R antenna module (four antennas for transmitting and eight antennas for receiving, thereby creating a virtual 1T32R antenna array) or to an even higher specification. For a conventional vehicle radar system equipped with the 4T8R antenna module, the angular resolution would be less than 4°. Therefore, it is possible to detect an object at a longer distance from the conventional vehicle radar system. However, the cost of the hardware would be much higher.

SUMMARY

Therefore, an object of the disclosure is to provide a vehicle radar system that can alleviate at least one of the drawbacks of the prior art.

According to the disclosure, the vehicle radar system is configured to detect a target object, and includes an antenna module, a radio frequency (RF) module, and a signal processor.

The antenna module includes at least one transmitting antenna and a plurality of receiving antennas.

The RF module includes a transmitting segment connected to the at least one transmitting antenna, and a receiving segment connected to the receiving antennas. The transmitting segment is configured to generate transmitting waves each carrying a transmitting signal, and transmit the transmitting waves via the at least one transmitting antenna. The receiving segment is configured to, for each of the transmitting waves, receive reflected waves respectively from the receiving antennas. Each of the reflected waves is formed due to a reflection of the transmitting wave by the target object and carries a received signal. With respect to each of the transmitting waves, the receiving segment is further configured to, for each of the received signals carried by the reflected waves, incorporate the received signal with the transmitting signal of the transmitting wave into a beat signal.

The signal processor is connected to the RF module and is configured to perform a two-dimensional fast Fourier transform (2D-FFT) on the beat signals that correspond to the transmitting waves to obtain estimated position information of the target object. The estimated position information represents a range of positions of the target object and includes a distance value. The signal processor is further configured to determine whether the distance value of the estimated position information is greater than a preset distance threshold, and when it is determined that the distance value is greater than the preset distance threshold, perform a two-dimensional Multiple Signal Classification (2D-MUSIC) on the estimated position information, so as to obtain an exact distance value and an exact angle value of the target object.

Another object of the disclosure is to provide a method for detecting a target object to be implemented by a vehicle radar system.

The vehicle radar system includes an antenna module having at least one transmitting antenna and a plurality of receiving antennas, an RF module having a transmitting segment connected to the at least one transmitting antenna and a receiving segment connected to the receiving antennas, and a signal processor connected to the RF module.

According to the disclosure, the method includes the following steps. In a step, the transmitting segment of the RF module generates transmitting waves each carrying a transmitting signal.

In another step, the transmitting segment transmits the transmitting waves via the at least one transmitting antenna.

In yet another step, for each of the transmitting waves, the receiving segment of the RF module receives reflected waves respectively from the receiving antennas. Each of the reflected waves is formed due to a reflection of the transmitting wave by the target object and carries a received signal. With respect to each of the transmitting waves, the receiving segment, for each of the received signals of the reflected waves, incorporates the received signal with the transmitting signal of the transmitting wave into a beat signal.

In still another step, the signal processor performs a 2D-FFT on the beat signals that correspond to the transmitting waves to obtain estimated position information of the target object. The estimated position information represents a range of positions of the target object and includes a distance value.

In one other step, the signal processor determines whether the distance value of the estimated position information is greater than a preset distance threshold, and when it is determined that the distance value is greater than the preset distance threshold, the signal processor performs a 2D-MUSIC on the estimated position information, to obtain an exact distance value and an exact angle value of the target object.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
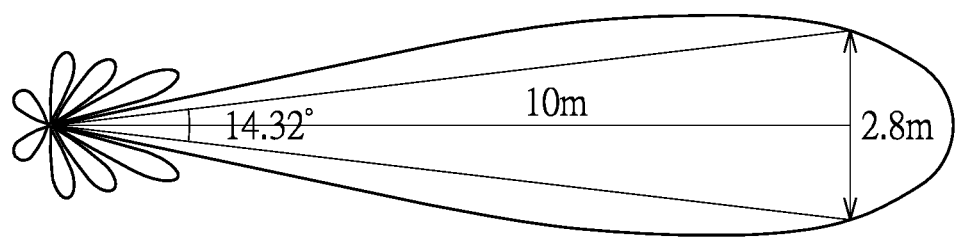
FIG. 1 is a schematic view illustrating a relationship between an angular resolution of a conventional vehicle radar system and a distance, within which the conventional vehicle radar system can detect an object.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
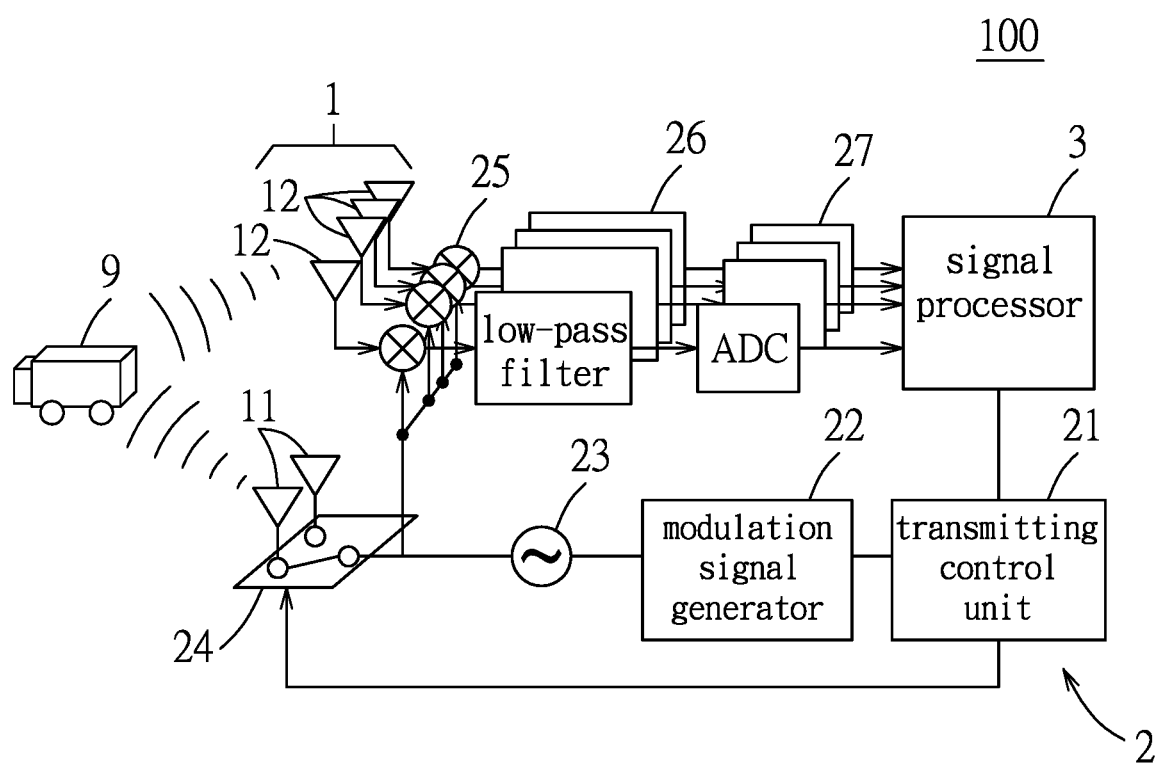
FIG. 2 is a block diagram illustrating an embodiment of a vehicle radar system according to the disclosure.

Referring to FIG. 2, an embodiment of a vehicle radar system 100 of the disclosure is adapted to be installed at the front of a vehicle (not shown) for implementing a method for detecting a target object 9 in front of the vehicle according to an embodiment of the disclosure. The vehicle radar system 100 includes an antenna module 1, a radio frequency (RF) module 2 and a signal processor 3.

In this embodiment, the antenna module 1 is a 2T4R type antenna module, which includes two transmitting antennas 11 for transmitting signals and four receiving antennas 12 for receiving signals. The receiving antennas 12 are spaced apart from each other. The antenna module 1 is not limited to a specific type, and, specifically, the number of transmitting antennas 11 and the number of receiving antennas 12 are not limited to the disclosure herein, but the number of receiving antennas 12 must be plural. In the case where the number of the transmitting antennas 11 is plural, radiation patterns of these transmitting antennas 11 may be different.

The RF module 2 includes a transmitting segment connected to the transmitting antennas 11, and a receiving segment connected to the receiving antennas 12. The transmitting segment generates a transmitting wave carrying a transmitting signal $T_x$, and transmits the transmitting wave via one of the transmitting antennas 11. The receiving segment receives reflected waves respectively from the receiving antennas 12, and each of the reflected waves is formed due to a reflection of the transmitting wave by the target object 9 and carries a received signal $R_x$. In detail, in this embodiment, the transmitting segment includes a transmitting control unit 21, a modulation signal generator 22, an oscillator 23 and a switching unit 24. The transmitting unit 21 is electrically connected to the signal processor 3, and is controlled by the signal processor 3 to generate a control signal. The modulation signal generator 22 is electrically connected to the transmitting control unit 21, and receives the control signal from the transmitting control unit 21 to generate a modulation signal based on the control signal. The oscillator 23 is electrically connected to the signal generator 22, and receives the modulation signal from the modulation signal generator 22 to modulate an oscillation frequency of the modulation signal to form the transmitting signal $T_x$. The switching unit 24 is electrically connected to the transmitting control unit 21 and the oscillator 23, and is controlled by the transmitting control unit 21 to connect the oscillator 23 to one of the transmitting antennas 11. Thus, the transmitting signal $T_x$ is transmitted from the oscillator 23 through the switching unit 24 to one of the transmitting antennas 11, and said one of the transmitting antennas 11 transmits the transmitting signal $T_x$.

Figure 3:
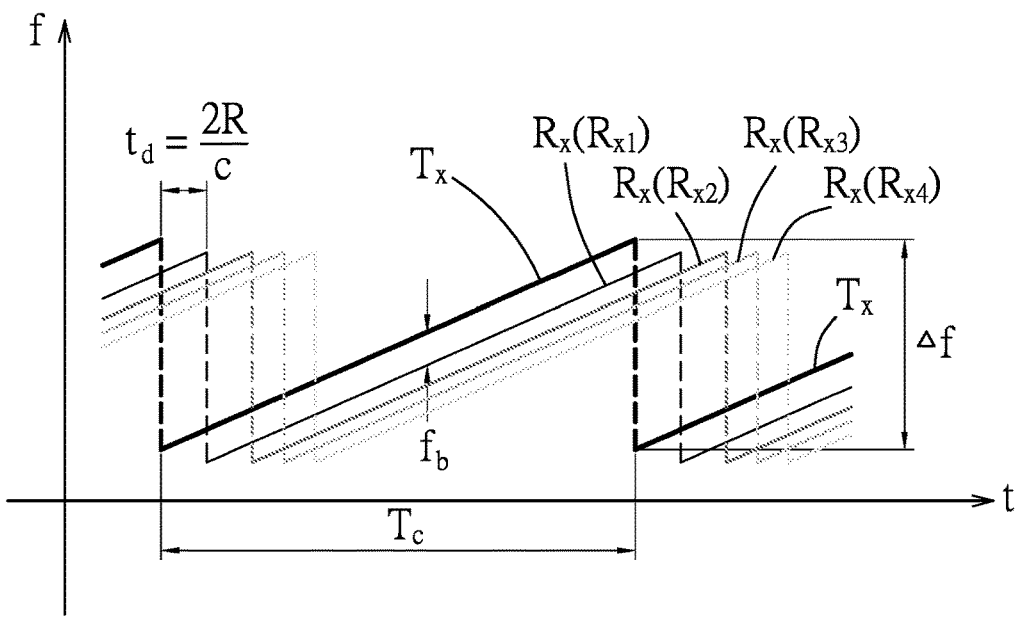
FIG. 3 is a timing diagram showing transmitting signals and received signals.

In this embodiment, the signal processor 3 controls the transmitting control unit 21, the modulation signal generator 22 and the oscillator 23 of the RF module 2, such that signals with time-varying frequencies (chirps, also known as chirp signals) are emitted by the transmitting antennas 11. FIG. 3 shows an example of a sequence of chirps, and each oblique line represents a chirp. The chirp has a period of $T_C$ and a bandwidth of $\Delta f$ In addition, in this embodiment, a beam pattern of the transmitting signal $T_x$ may be changed by switching, with the switching unit 24, between connecting the oscillator 23 to one of the transmitting antennas 11 and connecting the oscillator 23 to another one of the transmitting antennas 11, so as to improve adaptability. In other embodiments, it may be possible that the RF module 2 does not include the switching unit 24, and that radiation patterns of these transmitting antennas 11 are the same.

Each of the receiving antennas 12 receives the respective reflected wave formed due to a reflection of the transmitting wave by the target object 9. In this embodiment, the receiving segment of the RF module 2 includes multiple channels connected respectively to the receiving antennas 12 for receiving the reflected waves, respectively. Each of the channels is composed of a mixer 25, a low-pass filter 26, and an analog-to-digital converter (hereinafter referred to as ADC) 27 that are connected in series with each other. The mixer 25 is electrically connected to the oscillator 23. For each channel, the mixer 25 receives the received signal $R_x$ from the respective receiving antenna 12 which the mixer 25 is connected to, receives the transmitting signal $T_x$ from the oscillator 23, and incorporates the received signal $R_x$ and the transmitting signal $T_x$ into a beat signal; the low-pass filter 26 receives the beat signal from the mixer 25 and attenuates the high frequency components of the spectrum of the beat signal; and the ADC 27 receives and digitally samples the beat signal that has been processed by the low-pass filter 26 to obtain a digital data set. Finally, the signal processor 3 receives the digital data sets respectively from all of the channels. It should be noted that each digital data set includes digital data related to the transmitting signal $T_x$ and the respective received signal $R_x$.

Figure 4:
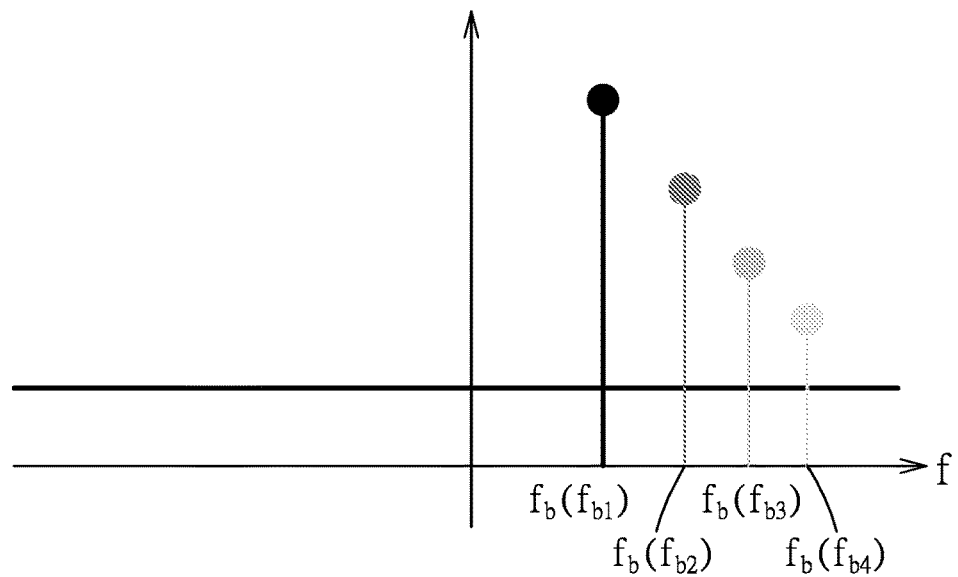
FIG. 4 is a beat frequency spectrum diagram illustrating the distribution of beat frequencies.

Further referring to FIGS. 3 and 4, the transmitting segment is configured to generate and transmit a plurality of the transmitting signals $T_x$ (only one complete transmitting signal $T_x$ is shown in FIG. 3) via the transmitting antennas 11 in a sequential manner (i.e., chirps), and thus each of the receiving antennas 12 receives the corresponding received signals $R_{x1}$, $R_{x2}$, $R_{x3}$, or $R_{x4}$ in a sequential manner. As a result, the signal processor 3 also receives the digital data sets in a sequential manner. The signal processor 3 performs a first fast Fourier transform (FFT) process (e.g., Range-FFT) on the digital data sets received from the channels to obtain information about a distance from the target object 9. In detail, for each of the transmitted signals $T_x$, after processing the transmitted signal $T_x$ and the corresponding received signals $R_x$ ($R_{x1}$, $R_{x2}$, $R_{x3}$, $R_{x4}$) by the Range-FFT, a beat frequency spectrum as shown in FIG. 4 and beat frequencies $f_b$ ($f_{b1}$, $f_{b2}$, $f_{b3}$, $f_{b4}$) corresponding respectively to the corresponding received signals $R_x$ may be obtained. Each of the beat frequencies $f_b$ is the difference in frequency between the transmitted signal $T_x$ and the corresponding received signal $R_x$, and may be expressed by the following equation:

$$f_b = \frac{2R}{c} \frac{\Delta f}{T_c}$$

The parameter R represents the distance from the target object 9 (from the perspective of the vehicle radar system 100), the parameter c represents the velocity of light, the parameter $\Delta f$ represents the bandwidth, and the parameter $T_C$ represents the period of the chirps.

Figure 5:
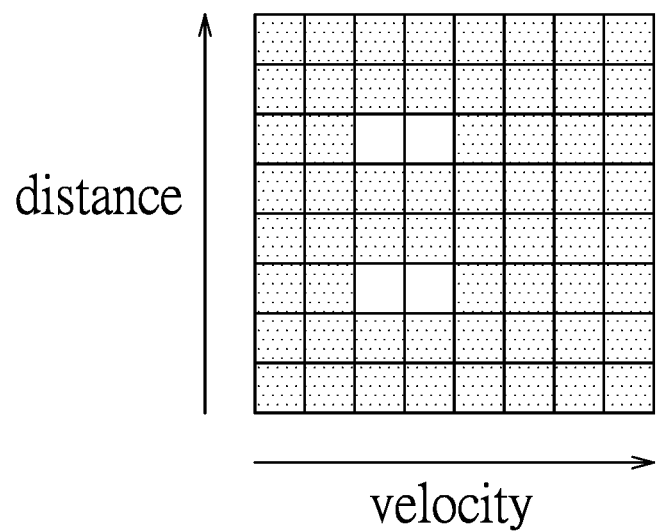
FIGS. 5-8 are views showing matrixes related to 2D-FFT.
Figure 6:
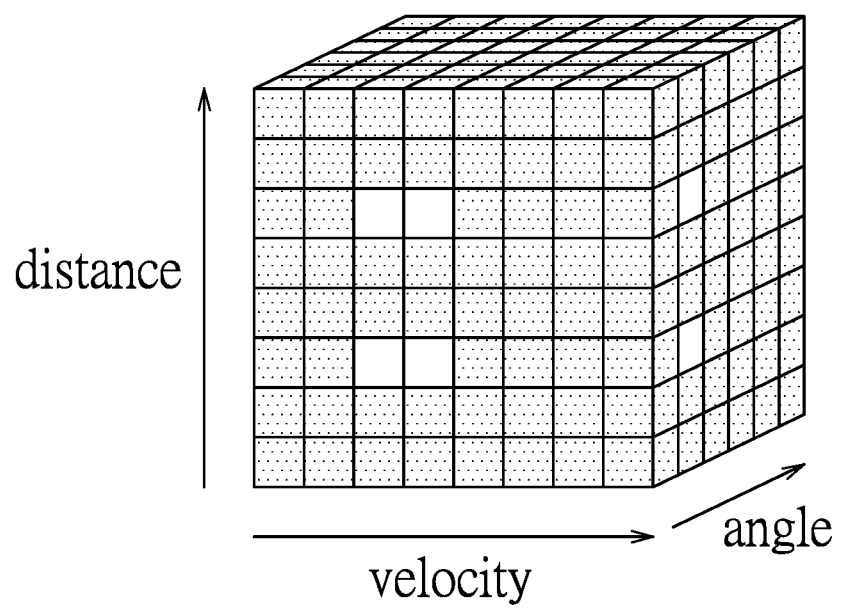
Figure 7:
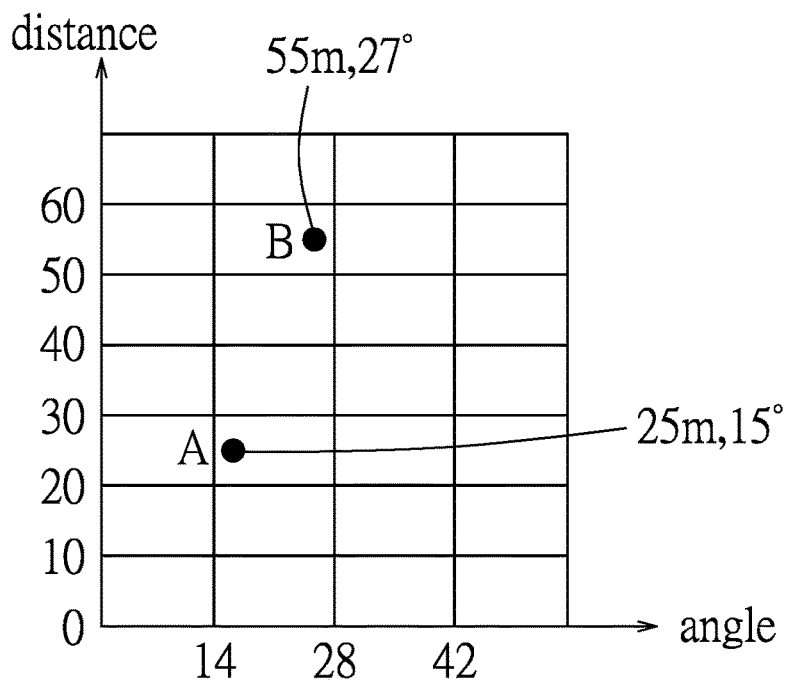

The signal processor 3 further performs a second FFT process (e.g., Doppler-FFT) on the beat frequency spectrums respectively corresponding to multiple transmitted signals $T_x$ to obtain information about velocity of the target object 9. That is, a 2D-FFT matrix with a vertical axis representing distance and a horizontal axis representing velocity can be generated as shown in FIG. 5. The signal processor 3 may further calculate an angle of the target object 9 based on the digital data sets received from the channels, so as to obtain angle-related information. It should be noted that the angle of the target object 9 is the angle-of-arrival of the received signals $R_x$ received by the receiving antennas 12 from the target object 9. Thus, the signal processor 3 may generate a radar data cube as shown in FIG. 6 having distance-related information, speed-related information and the angle-related information. The right side of the radar data cube shown in FIG. 6 is defined as a distance-angle matrix. In this embodiment, the signal processor 3 uses, but not limited to, at least one of MATLAB, Simulink and Phased Array System Toolbox to create the radar data cube. With the radar data cube, the signal processor 3 may obtain estimated position information of the target object 9 by performing peak detection on the distance-angle matrix to indicate a target grid where the target object 9 is located in. The target grid has a plurality of fine grids. The estimated position information represents a range of positions of the target object 9 (i.e., the range of the target grid), and includes a distance value and an angle value. That is, the signal processor 3 performs a 2D-FFT on the beat signals that correspond to the transmitting waves to obtain the estimated position information of the target object 9, including the distance and angle values. Since angular resolution of common 2T4R antennas is about 14 degrees, the scale of the horizontal axis (representing the angle) in FIG. 7 and FIG. 8 is 14 degrees.

In the following, an example of the vehicle radar system 100 detecting two different target objects (A) and (B) at different distances in front of the vehicle is illustrated. In FIG. 7, the angle-distance matrix illustrates that the actual distance and angle between the target object (A) and the vehicle radar system 100 are 25 meters and 15 degrees, the actual distance and angle between the target object (B) and the vehicle radar system 100 are 55 meters and 27 degrees. However, since both the target object (A) and the target object (B) are located in the column representing 14-28 degrees in the angle-distance matrix, the angular resolution is so limited that only the results of 25 meters and 21 degrees for the target object (A) and 55 meters and 21 degrees for the target object (B) can be read from the angle-distance matrix as shown in FIG. 8. In this disclosure, the signal processor 3 of the vehicle radar system 100 further analyzes the above results.

Figure 8:
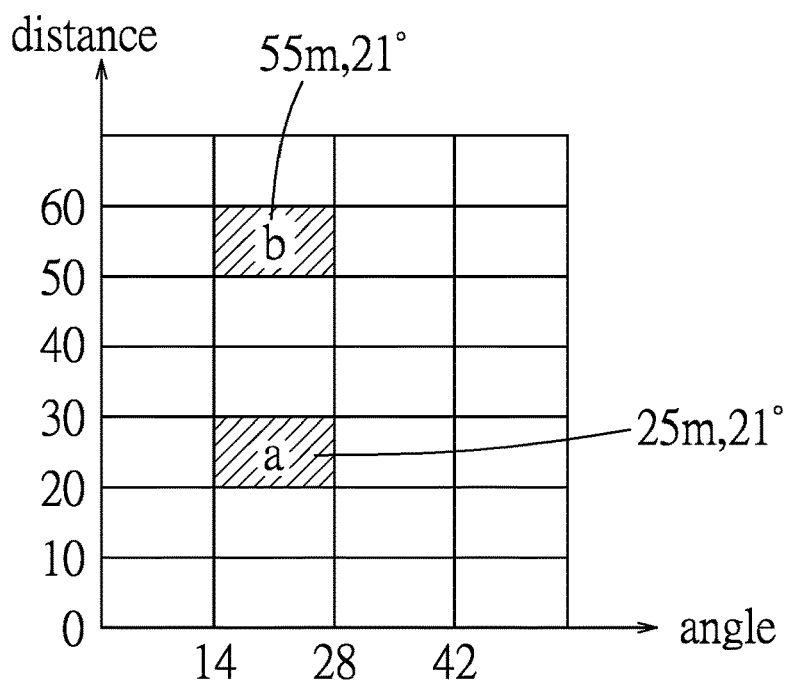
Figure 9:
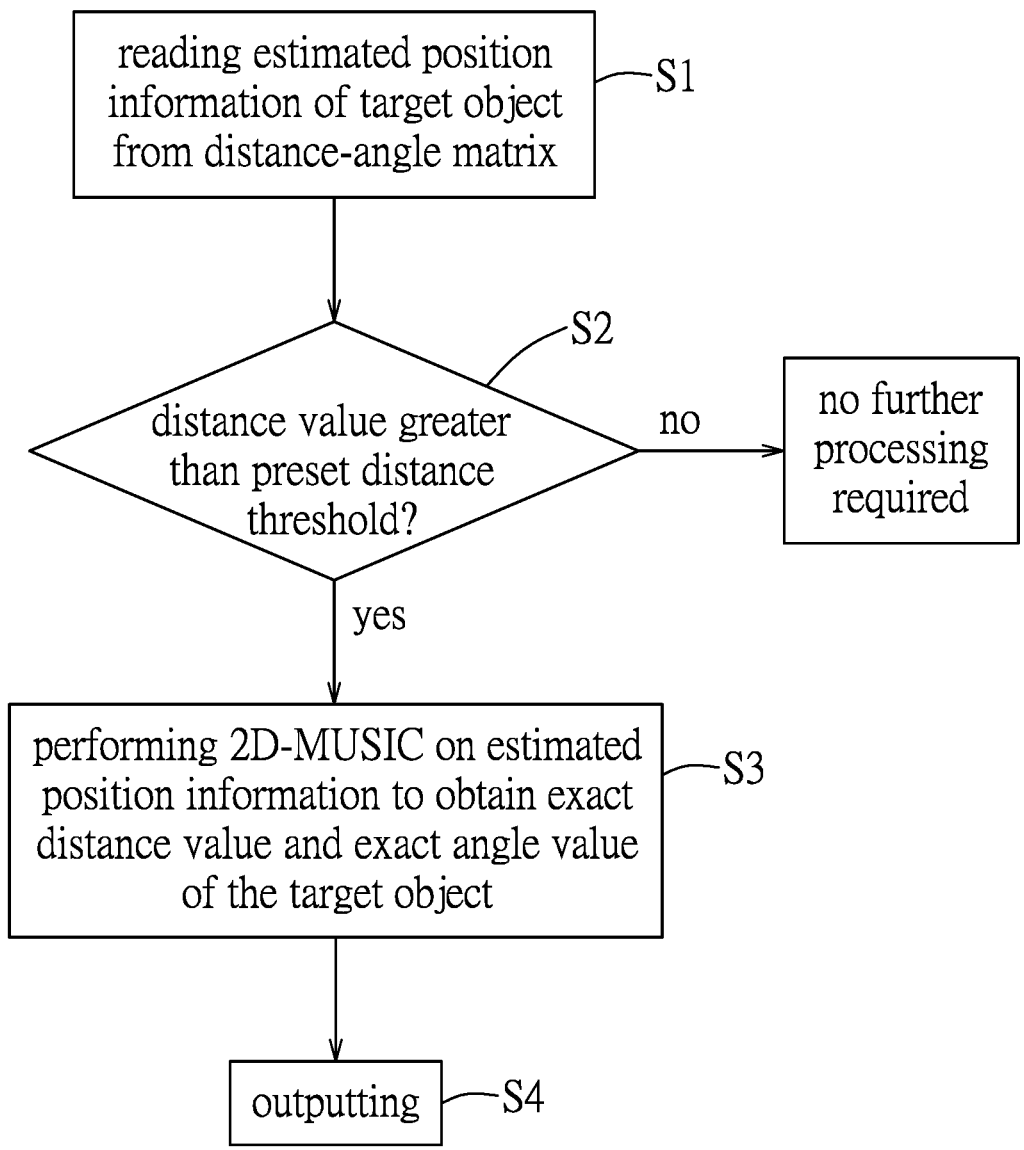
FIG. 9 is a flow chart illustrating some steps of a method for detecting a target object according to an embodiment of the disclosure.

Referring to FIGS. 8 and 9, in step S1, the signal processor 3 reads the estimated position information of each of the target objects (A, B) from the distance-angle matrix. In this example, in FIG. 8, the grid where the target object (A) is located in (hereinafter referred to as target grid (a)) is read as 25 meters and 21 degrees, and is referred to as the estimated position information of the target object (A). The estimated position information of the target object (A) represents a range of distances from 20 meters to 30 meters and a range of angles from 14 degrees to 28 degrees. The grid where the target object (B) is located in (hereinafter referred to as target grid (b)) is read as 55 meters and 21 degrees, and is referred as the estimated position information of the target object (B). The estimated position information of the target object (B) represents a range of distances from 50 meters to 60 meters and a range of angles from 14 degrees to 28 degrees.

For each of the target objects (A) and (B), in step S2, the signal processor 3 determines whether the distance value of the estimated position information is greater than a preset distance threshold, and when the determination is affirmative, the process goes on to step S3, or otherwise, no further processing is required. In other words, for any target object that has the distance value greater than the preset distance threshold, the process goes to step S3 and then step S4, and for any target object that has the distance value not greater than the preset distance threshold, no further processing is required with respect to this target object, i.e., the estimated position information for this target object is sufficient and should be sent back to a central processing unit (not shown) of the vehicle via the signal processor 3 for further application processing such as assisted driving. In this embodiment, the preset distance threshold is, but not limited to, 10 meters. The preset distance threshold may vary depending on the demands or environments.

In step S3, the signal processor 3 performs a two-dimensional Multiple Signal Classification (2D-MUSIC) algorithm on the estimated position information, i.e., data contents of the target grid under the range of positions, to obtain an exact distance value and an exact angle value of the target object. For the target grids (a) and (b) in FIG. 8, since the distance value of the target object (A) and the distance value of the target object (B) are both greater than 10 meters, the data contents of the target grids (a) and (b) should be processed using the 2D-MUSIC algorithm.

In this example, phased.MUSICEstimator2D, which is a tool provided by Matlab, is used to implement the 2D-MUSIC algorithm to estimate the direction of arrival (DoA) for the reflected waves. For each of the target grids (a) and (b), the process of step S3 includes creating a correlation matrix of the data contents of the target grid, calculating an autocorrelation matrix of the eigen-vector of the correlation matrix, obtaining a distance-correlation matrix and an angle-correlation matrix for the target grid, and finally calculating probabilities of the target object being in the fine grids in the target grid based on the distance-correlation matrix and the angle-correlation matrix. A set of coordinates of the fine grid that has the highest probability is taken as the exact distance value and the exact angle value of the target object. The aforementioned tool provided by Matlab is an available technology and is not the technical feature of this disclosure, so details thereof are not described herein.

In step S4, the exact distance value and the exact angle value of the target object are output to the central processing unit of the vehicle via the signal processor 3 for further application processing.

The signal processor 3 may further control the transmitting segment of the RF module 2 to adjust each of the transmitting waves to enhance a gain based on either the angle value of the estimated position information or the exact angle value, so as to improve a reflection strength of the target object 9. In this embodiment, the vehicle radar system 100 further creates a beamforming effect by adjusting the phase difference of the transmitted signals $T_x$ transmitted from the transmitting antenna 11. Specifically, the signal processor 3 can control the transmitting segment of the RF module 2 to adjust the transmitting signal $T_x$ after obtaining the angle value of the estimated position information of the target object 9, or after obtaining the exact angle value, and enhance the gain by, for example, 2 to 3 dB to improve the reflection strength of the target object 9. In this way, each of the transmitting signals $T_x$ transmitted by the transmitting antennas 11 will have a smaller angular range in the horizontal direction and thus have more concentrated energy, which can also reduce the noise reflected from other objects that are not in the lane.

It is noted that, since the accuracy of a Multiple Signal Classification (MUSIC) algorithm is related to the number of digital samples sampled by the ADC 27 of the RF module 2, rather than the number of virtual antennas, the lower angular resolution of 2D-FFT can be compensated for by using the 2D-MUSIC algorithm to calculate the exact distance value and the exact angle value of the target grid as long as the number of digital samples sampled by the ADC 27 is large enough. It is noted that in this disclosure, the 2D-MUSIC algorithm is performed only on the data contents of the target grid to find out the exact distance value and the exact angle value of the target object, thus significantly reducing the computational workload as compared with the 2D-MUSIC algorithm being performed with respect to all grids.

Furthermore, while only the angle value is needed to compensate for the shortage of 2D-FFT, the 2D-MUSIC algorithm, which can obtain both the distance and angle values, is employed in view of the advantage that the distance and angle values can be used to match with the results of the 2D-FFT, especially when there are multiple target objects. Taking the example of the target objects (A) and (B) as mentioned above, if a 1D-MUSIC algorithm is employed to obtain the exact angle values of 15 degrees and 27 degrees, since the estimated position information of the target objects (A) and (B) show that the target objects (A) and (B) are both in the range of angles from 14 degrees to 28 degrees, when the results of the 1D-MUSIC algorithm are integrated with the results of the 2D-FFT algorithm, it is not possible to determine whether it is "25 meters at 15 degrees," "55 meters at 15 degrees," "25 meters at 27 degrees," or "55 meters at 27 degrees," unless, for example, multi-baselines of interferometry are used to find the correspondences between the angle values and distance values. In this disclosure, using the 2D-MUSIC algorithm can directly find out the accurate distance and angle values that can be matched with the estimated position information. In other words, the 2D-MUSIC algorithm can be used to directly obtain that the distance of the target object (A) is 25 meters and the angle of the target object (A) is 15 degrees, and the distance of the target object (B) is 55 meters and the angle of the target object (B) is 27 degrees.

In summary, the vehicle radar system 100 uses the 2D-FFT to estimate the distance and angle of the target object 9, and then performs the 2D-MUSIC algorithm on the grid where the target object is located when the distance exceeds the preset distance threshold. Thus, it is possible to obtain an angle value with high resolution for distance objects without upgrading the antenna hardware and without a significant increase in computational load.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A vehicle radar system configured to detect a target object, comprising:
   an antenna module including at least one transmitting antenna, and a plurality of receiving antennas;

a radio frequency (RF) module including a transmitting segment connected to said at least one transmitting antenna, and a receiving segment connected to said receiving antennas, wherein said transmitting segment is configured to generate transmitting waves each carrying a transmitting signal ($T_x$), and transmits the transmitting waves via said at least one transmitting antenna, wherein said receiving segment is configured to, with respect to each of the transmitting waves, receive reflected waves respectively from said receiving antennas, each of the reflected waves being formed due to a reflection of the transmitting wave by the target object and carrying a received signal ($R_x$), and for each of the received signals ($R_x$) carried by the reflected waves, incorporate the received signal ($R_x$) with the transmitting signal ($T_x$) of the transmitting wave into a beat signal; and a signal processor connected to the RF module and configured to perform a two-dimensional fast Fourier transform (2D-FFT) on the beat signals that correspond to the transmitting waves to obtain estimated position information of the target object, the estimated position information representing a range of positions of the target object and including a distance value, determine whether the distance value of the estimated position information is greater than a preset distance threshold, and when it is determined that the distance value is greater than the preset distance threshold, perform a two-dimensional Multiple Signal Classification (2D-MUSIC) on the estimated position information, so as to obtain an exact distance value and an exact angle value of the target object;

wherein said receiving segment of said RF module includes multiple channels connected respectively to said receiving antennas for receiving the reflected waves, respectively; in each of said channels, for each of the reflected waves, the received signal (Rx) being incorporated with the transmitting signal (Tx) into the beat signal, and the beat signal being digitally sampled to obtain a digital data set;

wherein said signal processor performs a Range-FFT and a Doppler-FFT on the digital data sets from said channels, and generates a radar data cube having distance-related information, speed-related information and angle-related information;

wherein said signal processor obtains the estimated position information of the target object from the radar data cube;

wherein the radar data cube includes a distance-angle matrix; wherein said signal processor obtains the estimated position information of the target object from the radar data cube by peak detection; and wherein the estimated position information includes the distance value and an angle value; and wherein said signal processor is configured to:

perform the peak detection on the distance-angle matrix to indicate a target grid where the target object is located, the target grid having a plurality of fine grids, perform the 2D-MUSIC to calculate a distance-correlation matrix and an angle-correlation matrix for the target grid, calculate probabilities of the target object being in the fine grids based on the distance-correlation matrix and the angle-correlation matrix, and obtain the exact distance value and the exact angle value of the target object based on a set of coordinates of one of the fine grids that has the highest probability.

2. The vehicle radar system as claimed in claim 1, wherein said signal processor controls the transmitting segment to adjust each of the transmitting waves to enhance a gain based on either the angle value of the estimated position information or the exact angle value, so as to improve a reflection strength of the target object.

3. A method for detecting a target object to be implemented by a vehicle radar system, the vehicle radar system including an antenna module having at least one transmitting antenna and a plurality of receiving antennas, a radio frequency (RF) module having a transmitting segment connected to the at least one transmitting antenna and a receiving segment connected to the receiving antennas, and a signal processor connected to the RF module, the method comprising steps of:

by the transmitting segment of the RF module, generating transmitting waves each carrying a transmitting signal ($T_x$);

by the transmitting segment, transmitting the transmitting waves via the at least one transmitting antenna;

for each of the transmitting waves, receiving, by the receiving segment of the RF module, reflected waves respectively from the receiving antennas, each of the reflected waves formed due to a reflection of the transmitting wave by the target object and carrying a received signal ($R_x$);

with respect to each of the transmitting waves, by the receiving segment, for each of the received signals ($R_x$) carried by the reflected waves, incorporating, the received signal ($R_x$) with the transmitting signal ($T_x$) of the transmitting wave into a beat signal;

performing, by the signal processor, a two-dimensional fast Fourier transform (2D-FFT) on the beat signals that correspond to the transmitting waves to obtain estimated position information of the target object, the estimated position information representing a range of positions of the target object and including a distance value;

determining, by the signal processor, whether the distance value of the estimated position information is greater than a preset distance threshold; and when it is determined that the distance value is greater than the preset distance threshold, performing, by the signal processor, a two-dimensional Multiple Signal Classification (2D-MUSIC) on the estimated position information, so as to obtain an exact distance value and an exact angle value of the target object;

wherein the receiving segment of the RF module includes multiple channels connected respectively to the receiving antennas for receiving the reflected waves, respectively, wherein after the step of incorporating the received signal (Rx) with the transmitting signal (Tx) of the transmitting wave into a beat signal, the receiving segment digitally samples the beat signal to obtain a digital data set;

wherein the step of performing a 2D-FFT on the beat signals to obtain estimated position information of the target object includes:

performing a Range-FFT and a Doppler-FFT on the digital data sets from the channels;

generating a radar data cube having distance-related information, speed-related information and angle-related information;

reading the estimated position information of the target object from the radar data cube by peak detection, the estimated position information including the distance value and an angle value;

wherein the radar data cube includes a distance-angle matrix, wherein the step of reading the estimated position information of the target object from the radar data cube by peak detection includes performing the peak detection on the distance-angle matrix to indicate a target grid where the target object is located, the target grid having a plurality of fine grids; and wherein the step of performing the 2D-MUSIC on the estimated position information includes:

performing the 2D-MUSIC to calculate a distance-correlation matrix and an angle-correlation matrix for the target grid, calculating probabilities of the target object being in the fine grids based on the distance-correlation matrix and the angle-correlation matrix, and obtaining the exact distance value and the exact angle value of the target object based on a set of coordinates of one of the fine grids that has the highest probability.

4. The method as claimed in claim 3, further comprising a step of:

by the signal processor, controlling the transmitting segment to adjust each of the transmitting waves to enhance a gain based on either the angle value of the estimated position information or the exact angle value, so as to improve a reflection strength of the target object.

* * * * *